INVENTOR
BILLY BURLEY

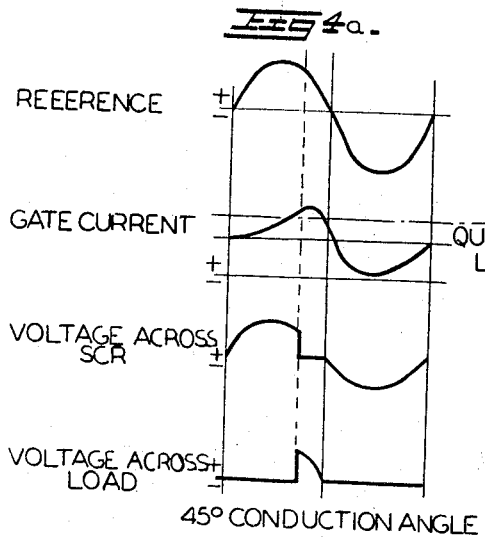
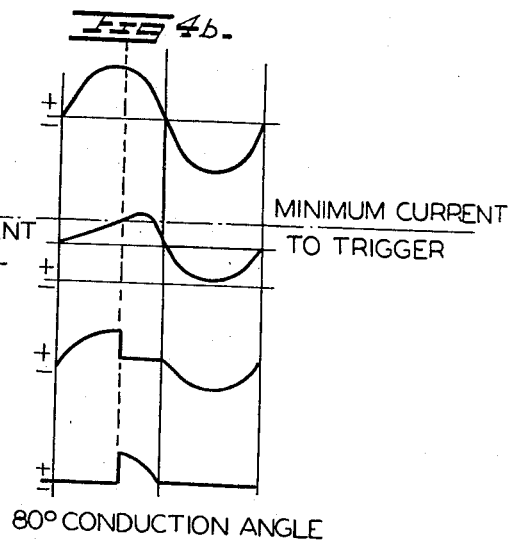
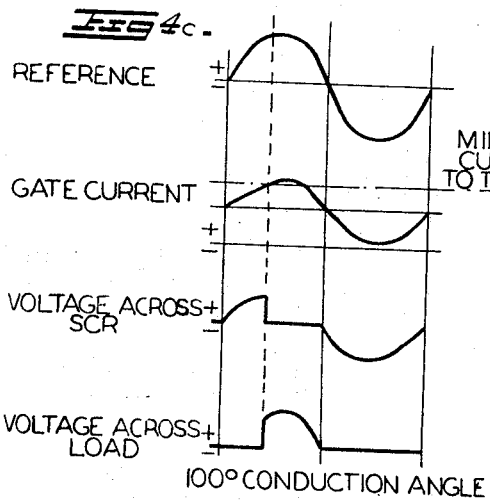
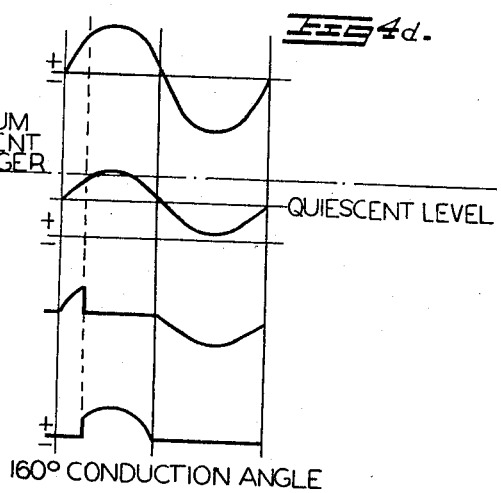
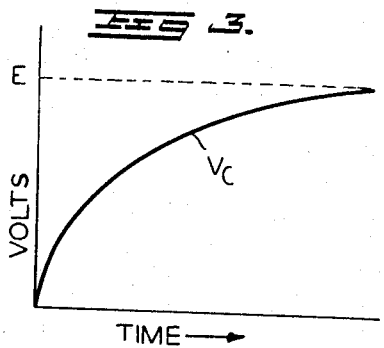
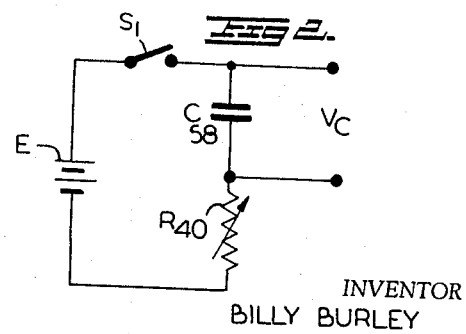

United States Patent Office 3,371,231
Patented Feb. 27, 1968

3,371,231
ELECTRONIC CONTROL AFFORDING MODULATING CONTROL OF A LOAD CURRENT IN ACCORDANCE WITH A SENSED CONDITION
Billy Burley, Dallas, Tex., assignor to Johnson Service Company, Milwaukee, Wis., a corporation of Wisconsin
Continuation of application Ser. No. 206,345, June 29, 1962. This application Oct. 22, 1964, Ser. No. 407,273
7 Claims. (Cl. 307—308)

ABSTRACT OF THE DISCLOSURE

A silicon controlled rectifier is connected in series circuit with a load to an alternating current reference voltage. An adjustable network is connected to the gate of the controlled rectifier to establish a time constant causing said component to have a given angle of conduction relative to said reference voltage. The adjustable network includes a capacitor connected in series with the emitter and collector electrodes of a transistor. A variable resistor also connects the base to the collector. A direct current source is applied to the circuit to establish a current through the capacitor just below the triggering value of the SCR. A Wheatstone-type bridge is connected to the base electrode of the transistor and superimposes an A-C signal upon the D-C gate biasing current to control triggering of the SCR. The magnitude of the signal voltage affects the time constant of the R-C network (and consequently the phase relationship between the anode to cathode reference voltage and the amplified gate to cathode signal voltage) and thereby varies the conduction angle and the level of effective D-C load current as a function of the magnitude of the condition deviation.

---

Figure 1:
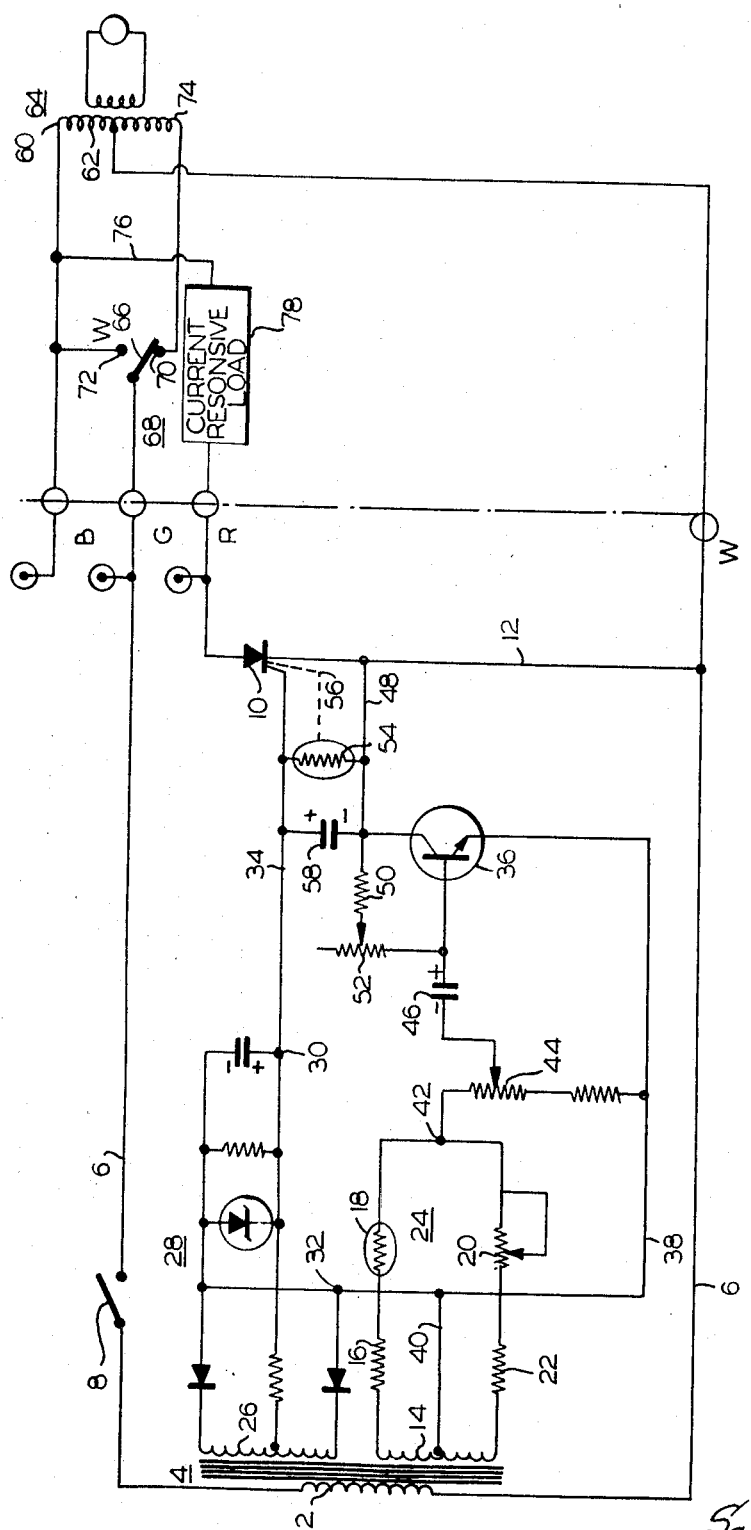

This invention relates to an electronic control system which produces an output current that is a function of the degree of deviation of a measured condition from a predetermined value and is a continuation of my application Ser. No. 206,345, filed on June 29, 1962, and now abandoned.

It has proven difficult in the past to provide a condition-responsive electronic control system which will accurately operate a high-current electrical load in modulating response to condition deviations. In order to obtain sufficient output current, conventional control systems generally include several power amplifying stages, thus resulting in an apparatus that is relatively complex and expensive. A recent development in the solid-state semiconductor art is the silicon controlled rectifier. Owing to its high current-carrying capacity and its capability of accurate switching from non-conductive to conductive conditions, the component has considerable value as a load current switching element. The present invention relates to means controlling the operation of a silicon controlled rectifier connected in the load circuit of an electronic control system to produce an effective D-C output that is a function of the degree of deviation of a measured condition from a predetermined value. As a consequence of the invention, an inexpensive, simplified electronic control is provided that affords accurate modulating response to condition deviations. A silicon controlled rectifier (SCR) is a bi-stable four-layer semiconductor component having anode, cathode and gate electrodes. Its operation is analogous to that of a conventional grid-controlled thyratron. Under certain operating conditions, the SCR can be switched from nonconductive to conductive conditions only when the anode and gate are positive relative to the cathode and the gate electrode potential equals or exceeds a given triggering value. Once the SCR becomes conductive, the gate electrode loses its control and the SCR may be returned to the nonconductive condition only by decreasing the anode to cathode current level below the "holding" value or by causing the anode to be negative with respect to the cathode. Consequently, when the anode and cathode electrodes are connected in a load circuit and an alternating-current reference potential is applied across the two electrodes, the SCR can be conductive only during positive half cycles of the reference voltage. By appropriate gate electrode control, the time at which the SCR "fires" during positive half cycles of the reference voltage (i.e., the "conduction angle" of the SCR relative to the reference voltage) determines the length of time the SCR is conductive during said alternate half cycles and, consequently, the magnitude of the effective level of the pulsating direct current sensed by the load. According to the present invention, means are provided for varying the conduction angle of a silicon controlled rectifier (or similar bistable component) as a function of the deviation in a measured condition from a predetermined value, whereby the effective D-C load current has a value that is a function of the degree of condition deviation.

One object of the present invention is to provide electronic control means including a bistable device having alternate states of conduction and nonconduction for supplying intermittent electrical power to a load, and condition-responsive means controlling the duration of the conductive states of said device.

A more specific object of the invention is to provide a condition-responsive electronic control affording modulating response and including bistable means having alternate states of conduction and nonconduction for supplying intermittent power to a load, alternating-current reference voltage means for periodically switching said bistable means from conductive to non-conductive conditions, triggering means including an adjustable alternating-current network for switching said bistable means from nonconductive to conductive conditions at given times relative to said reference voltage, and condition-responsive means for adjusting said network to vary the time constant thereof and the instantaneous times at which said bistable means is switched to the conductive condition relative to said reference voltage.

Another object of the invention is to provide an electronic control system supplying intermittent power to an electrical load and including a bistable device having alternate states of conduction and nonconduction and provided with anode, control and cathode electrodes, the anode to cathode circuit of said device being connected in series with said load, and condition-responsive means connected with the control electrode of said device determining the length of the conductive periods of said bi-stable device.

A further object of the invention is to provide an electronic system operable to produce modulating control in response to condition deviations and including a silicon controlled rectifier, load circuit means applying an alternating current reference voltage across the anode and cathode electrodes of said SCR, adjustable network means connected with the gate electrode of said SCR and operable to establish a time constant causing said component to have a given angle of conduction relative to said reference voltage, and condition-responsive means for adjusting said network means to vary said conduction angle as a function of the degree of deviation of a condition from a predetermined value. According to the preferred embodiment of the invention, the adjustable network means comprises an R-C network including a capacitor connected in series with the emitter and collector electrodes of a transistor. Circuit means including said transistor are provided for biasing the gate electrode to a direct-current level just below the triggering value of the SCR. Conditioning-responsive bridge network means connected with the base electrode of the transistor cause an A-C signal to be superimposed upon the D-C gate biasing current to effect triggering of the SCR. The magnitude of the signal voltage affects the time constant of the R-C network (and consequently the phase relationship between the anode to cathode reference voltage and the amplified gate to cathode signal voltage) and thereby varies the conduction angle and the level of effective D-C load current as a function of the magnitude of the condition deviation.

A further object of the invention is to provide a simple, inexpensive electronic control system having a minimum number of components and operable to produce a high output current in modulating response to condition deviations.

Other objects and advantages of the invention will become apparent from a study of the following specification when considered in conjunction with the accompanying drawing, in which:

FIG. 1 is a schematic circuit diagram of the electronic control;

FIGS. 2 and 3 illustrate, respectively, a simple R-C circuit and the voltage-time capacitor charging curve produced thereby; and FIGS. 4(a) through 4(d) illustrate the voltage waveforms at various points on the circuit of FIG. 1 for conduction angles of 45°, 80°, 100° and 160°, respectively.

Referring to FIG. 1, the electronic control is provided with four terminals B, G, R and W. Terminals G and W are connected with opposite ends of primary winding 2 of transformer 4 via conductor 6 including switch 8, and terminal R is connected with the anode electrode of silicon controlled rectifier 10. The cathode electrode of SCR 10 is connected with terminal W via conductors 12 and 6.

A first secondary winding 14 of transformer 4 is connected in series with fixed resistor 16, condition responsive resistor 18, variable resistor 20, and fixed resistor 22 to define bridge network 24. A second secondary winding 26 of transformer 4 is connected in a conventional full wave rectifier circuit 28 having positive and negative terminals 30 and 32, respectively. Terminal 30 is connected with the gate electrode of silicon controlled rectifier 10 via conductor 34, and terminal 32 connected with the emitter electrode of transistor 36 via conductor 38. The center tap of secondary winding 14 is connected with negative terminal 32 via conductors 40 and 38, and the other bridge terminal 42 is connected with the base electrode of transistor 36 via voltage divider network 44 and coupling capacitor 46. The collector electrode of transistor 36 is connected with the cathode of SCR 10 via conductors 48 and 12. Fixed resistor 50 and adjustable resistor 52 are connected across the base and collector electrodes of transistor 36. As disclosed in my copending application Ser. No. 206,344 filed June 29, 1962 (now abandoned) and entitled, "Temperature Stabilized Silicon Controlled Rectifier," temperature compensating thermistor 54 is connected in parallel with the gate to cathode circuit of SCR 10 and in heat transfer relationship therewith as shown diagrammatically by phantom line 56. Capacitor 58 is connected across conductors 48 and 34 in parallel with the gate to cathode circuit of SCR 10 and cooperates with transistor 40 to define an R-C network as disclosed in my copending application Ser. No. 206,346 filed June 29, 1962, now Patent No. 3,225,214 and entitled "Transistorized R-C Network."

Terminals B, G, R and W may be connected with suitable power supply and load circuits to afford various types of electronic control (such as direct or reverse acting control, both sides of null response, reversible modulation control, or the like). In the illustrated reversible modulation control system, terminal B is connected with one end 60 of secondary winding 62 of power transformer 64. Terminal G is connected with movable contact 66 of single pole double throw switch 68 the stationary contacts 70 and 72 of which are connected with ends 74 and 60, respectively, of secondary winding 62. Terminal R is connected with end 60 of secondary winding 62 via conductor 76 including current-responsive load 78, and terminal W is connected with the center tap of winding 62.

*Operation*

For purposes of illustration, the electronic control will be described with reference to a heating and air conditioning system of the "two pipe" type in which hot and cold fluids are alternately conducted through a conduit in the winter and summer months, respectively. It will be assumed that load 78 comprises a linear-response resistance-heated expansible fluid actuator for controlling the position of a modulating valve in the conduit as a function of actuator load current, and that the valve is spring-biased to a fully open position (similar to the current-responsive load of my copending application Ser. No. 206,343 filed June 29, 1962 entitled "Electronic System Affording Reversible Modulating Control"). Assume further that condition responsive variable resistance 18 is a thermistor and that bridge network 24 is balanced when sensed temperature equals the "set" temperature (for example, 75° F.) established by variable resistor 20. Assume also that variable resistor 52 is set to establish a quiescent collector current (flowing from terminal 30 to terminal 32 via conductor 34, the gate to cathode circuit of SCR 10, conductors 12 and 48, the collector to emitter circuit of transistor 36, and conductor 38) that is slightly below the minimum gate current required to trigger silicon controlled rectifier 10.

Before going further, consideration must be given to the operation of the R-C series network consisting of capacitor 58 and transistor 36. As disclosed in the aforementioned copending application entitled "Transistorized R-C Network" transistor 36 and capacitor 58 define a series network as shown schematically in FIG. 2. The capacitor voltage $V_c$ may be expressed by the equation $$V_c = E[1 - e^{-t/R_{iv}C_{58}}] \quad (1)$$

By varying the time constant of the R-C network, the slope of the capacitor voltage versus time curve of FIG. 3 is varied. For example, if the product of resistance and capacitance is increased, the time required for $V_c$ to reach E is increased. Conversely, if the product of resistance and capacitance is decreased, the time required for $V_c$ to reach E is decreased.

In accordance with the present invention, the R-C time constant of the network including capacitor 58 and transistor 36 is varied as a function of the deviation in a condition from a predetermined value to control the duration of the conductive states of SCR 10. Since the effective "resistance" of transistor 36 varies in accordance with the magnitude of the bridge unbalance signal voltage applied to the base electrode via voltage divider 44 and capacitor 46, the time constant of the R-C network and the charging rate of capacitor 58 vary in response to changes in a sensed condition from a predetermined value. Referring to the curves of FIG. 4, it will be seen that the duration of the conductive state of SCR (i.e., the conduction angle) is dependent upon the "Firing" time of the gate triggering current relative to the reference voltage applied across the anode to cathode circuit of SCR 10. The quicker the gate current reaches its minimum level to trigger, the longer the silicon controlled rectifier will conduct (and consequently, the longer will be the time during which voltage is applied to the load). As shown in FIGS. 4(a)-4(d), the time of conduction of the silicon controlled rectifier progressively increases as the conduction angle varies from 45° to 160°. It should be mentioned that at 180° conduction angle, the anode and gate electrodes can never both be positive relative to the cathode, and consequently no current will flow through the anode to cathode circuit of SCR 10 for this phase angle.

(a) Summer

In summer operation with seasonal switch 68 in the illustrated summer position, when temperature responsive bridge 24 is balanced, the level of the D-C quiescent current applied to the gate of SCR 10 is below the triggering value, and consequently SCR 10 is in a non-conductive condition, load 78 is de-energized, and the spring-biased modulating valve is in a fully open condition to permit maximum flow of cooling fluid to the demand.

Assume now that the sensed temperature exceeds the set temperature (75°) established by variable resistor 20. A bridge unbalance signal of a given phase and of a magnitude that is a function of the degree of temperature deviation will appear at junction 42 and will be applied to the base electrode of transistor 36 via voltage divider 44 and capacitor 46. The instantaneous base electrode current will now rise above and fall below the quiescent D-C level of current (determined by variable resistor 52) at the same rate as the bridge unbalance signal voltage. However, owing to the out of phase relationship between the reference voltage applied across the anode and cathode electrodes of SCR 10 and the gate to cathode signal voltage, the gate never becomes positive with respect to the cathode when the anode is positive with respect to the cathode and consequently the electronic control continues to be de-activated, SCR 10 is non-conductive, and actuator load 78 is de-energized.

If the sensed temperature should equal a value (for example, 74°) below set temperature, a bridge unbalance signal of opposite phase and of a magnitude that is a function of the degree of temperature deviation will appear at junction 42. The signal voltage is applied to the base electrode of transistor 36 via voltage divider 44 and capacitor 46 and is superimposed upon the D-C quiescent biasing level whereby the instantaneous gate current exceeds the minimum triggering level at some time during the positive half cycles of reference voltage. Since the signal voltage is now in phase with the anode to cathode voltage of SCR 10, the SCR is triggered to a conductive condition. The effective impedance of transistor 36 is dependent upon the magnitude of the signal voltage applied to the base electrode, and consequently the R-C time constant of capacitor 58 and transistor 36 is a function of the degree of unbalance of bridge network 24 (i.e., the magnitude of temperature deviation from the set value). Assuming that the magnitude of the signal voltage establishes a time constant resulting in a conduction angle of 160° (FIG. 4(d), the SCR quickly becomes conductive and remains in the conductive condition for a relatively large portion of the positive half cycle of the reference voltage power supplied to the anode of SCR 10 via actuator load 78. During the negative half cycles of power applied between the anode and cathode of SCR 10, the silicon controlled rectifier is in the non-conductive condition. Thus, the actuator load 78 senses positive D-C voltage pulses having an effective value that is a function of the conduction angle (which in turn is a function of the R-C time constant, the magnitude of bridge unbalance, and the degree of temperature deviation).

With proper calibration of the system, when the magnitude of the signal voltage establishes a conduction angle of 160°, the effective D-C load current has a value which causes actuator 78 to place the modulating valve in a substantially closed throttling condition, thus reducing the flow of cooling medium to the demand. As the room temperature progressively increases, the bridge unbalance decreases, the signal voltage decreases, the effective impedence of transistor 36 increases, the R-C time constant increases to reduce the conduction angle. As shown in FIG. 4, as the conduction angle progressively decreases, the duration of the conductive periods of SCR 10 progressively decreases, and consequently, the effective D-C current through actuator 78 progressively decreases. Owing to the decrease in load current, the modulating valve is progressively returned toward its fully open position. When the ambient temperature equals set temperature, the bridge is balanced, signal voltage equals zero, the level of gate current is below the triggering value, silicon controlled rectifier 10 becomes nonconductive, the electronic control is deactivated, load 78 is deenergized, and the modulating valve is spring-biased to the fully open condition.

Thus, it is apparent that modulating response of the valve is obtained only when seasonal switch 68 is in the summer position and when ambient temperature is below set temperature.

(b) Winter

During winter operation, seasonal switch 68 is switched to the winter position and heated fluid is supplied to the demand.

When room temperature equals set temperature, the bridge is balanced, signal voltage equals zero, the gate quiscent current level is just below the triggering level, SCR 10 is nonconductive, load 78 is deenergized, and the modulating valve is spring biased to its fully open position.

If room temperature is below set temperature, the out of phase relationship between the signal voltage applied to the gate electrode of SCR 10 and the reference voltage applied across the anode and cathode electrodes prevents the gate from becoming positive relative to the cathode when the anode is positive relative to the cathode. Consequently, SCR 10 remains nonconductive and the electronic control remains deactivated when room temperature is below set temperature. The modulating valve remains spring biased to its fully open condition.

Assume, however, that room temperature exceeds set temperature. The signal voltage at junction 42 now has a phase relationship that will cause the amplified signal voltage applied across the gate to cathode circuit of SCR 10 to be in phase with the anode to cathode reference voltage. The magnitude of the signal voltage is a function of the degree of deviation of set temperature from room temperature. Owing to the biasing potential of the base electrode, the effective impedance of transistor 36 co-operates with capacitor 58 to establish a time constant which produces a relatively high conduction angle. Consequently, the conducting time of SCR 10 is relatively long, and the effective D-C level of the positive pulses of load current flowing through actuator load 78 is relatively high, whereby the modulating valve is actuated to a substantially closed throttling condition to reduce the flow of heated fluid to the demand. As the room temperature decreases, the signal conduction angle decreases, and the effective D-C load current decreases. When room temperature equals set temperature, the electronic control becomes deactivated as described above. Consequently, during winter operation the electronic system affords modulating control when room temperature exceeds set temperature.

The invention is not to be construed as being limited solely to temperature-responsive systems. For example, bridge networks of the variable resistance, capacitance, inductance or impedance types may be used which are responsive to variable conditions such as pressure, humidity, rate of flow, magnetic fields or the like. Moreover, (for example, a differential transformer) other than a bridge network may be used to produce signal voltages of opposite phases for deviations in a condition in opposite senses from a predetermined value. Furthermore, the basic electronic control may be used in applications other than with the disclosed seasonal changeover power supply. It will be obvious to those skilled in the art that other modifications and embodiments might result from the illustrated and described apparatus without deviating from the invention set forth in the following claims.

I claim:

1. An electronic system providing a load current having a magnitude that is a function of the degree of deviation of a condition from a selected value, comprising
   a triggered electronic control unit having a pair of load electrodes and a gate electrode and conducting in response to a selected input signal to the gate electrode and one load electrode,
   load circuit means applying an alternating current reference voltage across said load electrodes,
   means continuously applying a reference current between the gate electrode and one load electrode of a magnitude approaching but less than the firing level for the control unit,
   means for continuously superimposing upon the reference current an alternating current triggering signal for switching the unit into a conductive state, said last-named means including an adjustable network having a time constant for determining the precise firing of the control unit, and
   condition responsive means for adjusting said network to vary the time constant thereof as a function of the degree of deviation of the condition from said predetermined value.

2. The electronic system for providing a load current in accordance with claim 1 wherein
   said condition responsive means includes an alternating current input and generates said alternating current triggering signal in synchronism with the reference voltage, and
   switch means for reversing the phase of the alternating current input of the condition responsive means relative to the alternating current reference voltage of the load circuit means.

3. The electronic system for providing a load current in accordance with claim 1 wherein said electronic control unit is a silicon controlled rectifier.

4. An electronic system providing a load current having a magnitude that is a function of the degree of deviation of a condition from a predetermined value, comprising
   a silicon controlled rectifier having anode, cathode and gate electrodes,
   load circuit means applying an alternating current reference voltage across said anode and cathode electrode,
   a power supply input means,
   a current responsive load serially connected with said power supply means and the anode-cathode circuit of the silicon controlled rectifier,
   a condition responsive means energized from said power supply means and impressing an alternating current control signal on the gate-cathode circuit of the rectifier of a magnitude insufficient to fire the silicon controlled rectifiers,
   a full wave rectifier circuit connected to said power supply means and having an output connected to said gate-cathode circuit to establish a quiescent current insufficient to alone trigger the silicon controlled rectifier and of a sufficient magnitude to permit selected alternating current control signals to trigger the silicon controlled rectifier, and
   switch means to reverse the phase of said control signal and thereby reverse the directional deviation operable to trigger the rectifier.

5. The electronic control of claim 4 having means to adjust said quiescent current.

6. A condition responsive electronic system affording modulating control over a current responsive controlled device, comprising
   a silicon controlled rectifier having anode, cathode and gate electrodes,
   load circuit means for applying an alternating current reference voltage across said anode and cathode electrodes,
   means biasing said gate electrode to a direct current voltage level that is slightly below the gate triggering voltage of said silicon controlled rectifier, said biasing means including a transistor having emitter and collector electrodes connected in series with said gate and cathode electrodes, said transistor also having a base electrode,
   a capacitor connected in parallel across the gate to cathode circuit of said silicon controlled rectifier and cooperating with said transistor to define an R-C network, and
   condition responsive means applying to said base electrode an alternating current signal voltage having a magnitude that is a function of the degree of deviation of a condition from a predetermined value, said signal voltage being operable to raise the gate potential of said silicon controlled rectifier above the triggering level.

7. An electronic control system for controlling a current responsive load as a function of a deviation of a condition from a predetermined value, comprising
   an alternating current reference voltage source,
   a current responsive load,
   a bistable device having anode, cathode and control electrodes,
   load circuit means connecting said load and the anode to cathode circuit of said bistable device in series with said reference voltage source,
   a direct current voltage source,
   a timing capacitor having a first terminal connected with said control electrode and a second terminal connected with said cathode electrode,
   a transistor having emitter, collector and base electrodes,
   biasing circuit means connecting the emitter to collector circuit of said transistor in series with said capacitor and said direct current voltage source, said first and second capacitor terminals being connected with said direct current source and said emitter to collector circuit, respectively, said biasing circuit means also including resistor means connected between said base electrode and said second capacitor terminal for effecting a quiescent current flow through said transistor that is slightly below the firing level of said bistable device, and
   condition responsive bridge network means connected with said base electrode for applying thereto an alternating current signal voltage having a magnitude that is a function of the degree of deviation of a condition from a predetermined value, said bridge network means including an energizing winding, and means energizing said winding with an alternating current voltage having the same frequency and a given phase relationship relative to said reference voltage.

References Cited

UNITED STATES PATENTS

| 3,050,611 | 8/1962 | Kamide | 307—88.5 |
| 3,146,392 | 8/1964 | Sylvan | 307—88.5 |
| 3,159,737 | 12/1964 | Dora | 328—3 |
| 3,226,627 | 12/1965 | Fromkin | 307—88.5 |

ARTHUR GAUSS, *Primary Examiner.*

J. ZAZWORSKY, R. H. EPSTEIN,
*Assistant Examiners.*